(12) United States Patent
Butler et al.

(10) Patent No.: US 8,141,920 B2
(45) Date of Patent: Mar. 27, 2012

(54) GRIPPER

(75) Inventors: Bradley A. Butler, Ottawa, KS (US); Jack E. Beauchamp, Pomona, KS (US)

(73) Assignee: Accel Pak, Incorporated, Ottawa, KS (US)

( * ) Notice: Subject to any disclaimer, the term of this patent is extended or adjusted under 35 U.S.C. 154(b) by 146 days.

(21) Appl. No.: 12/710,420

(22) Filed: Feb. 23, 2010

(65) Prior Publication Data

US 2011/0204665 A1 Aug. 25, 2011

(51) Int. Cl.
*A01K 81/04* (2006.01)

(52) U.S. Cl. ............................................ 294/61; 294/26

(58) Field of Classification Search ............... 294/8.6, 294/15, 26, 61, 5; 271/18.3; 38/102.91; 160/382; 254/199, 200, 204, 212
See application file for complete search history.

(56) References Cited

U.S. PATENT DOCUMENTS

| | | | |
|---|---|---|---|
| 3,176,979 A | 4/1965 | Englemann | |
| 4,068,451 A | 1/1978 | Bewerse et al. | |
| 4,394,004 A * | 7/1983 | Allen et al. | 254/204 |
| 4,516,762 A | 5/1985 | Moltrasio et al. | |
| 4,579,331 A * | 4/1986 | Nestler et al. | 271/18.3 |
| 5,129,696 A * | 7/1992 | Underwood | 294/8.6 |
| 5,356,126 A * | 10/1994 | Bayer et al. | 271/10.01 |
| 6,065,271 A | 5/2000 | Nicastro | |
| 2003/0102681 A1* | 6/2003 | Bouchard | 294/64.1 |

* cited by examiner

*Primary Examiner* — Saul Rodriguez
*Assistant Examiner* — Stephen Vu
(74) *Attorney, Agent, or Firm* — Dale J. Ream

(57) ABSTRACT

A gripper includes a housing defining an interior area and having a work surface, the work surface defining an opening to the interior area. The gripper includes a pair of outer stationary plates in the interior area that are fixed to the housing, each having a plurality of linear first hooks extending away from the work surface. The first hooks are angled parallel to one another and toward a housing first end. An inner plate is positioned in the interior area between the outer plates and includes linear second hooks extending away from the work surface. The second hooks are angled parallel to one another and opposite the first hooks. The inner plate is movable between a grip configuration and a release configuration. An actuator causes the inner plate to selectively move toward a housing second end to the grip configuration and toward the first end to the release configuration.

17 Claims, 11 Drawing Sheets

GRIPPER

BACKGROUND OF THE INVENTION

This invention relates generally to gripping equipment and, more particularly, to a gripper for gripping a woven material, such as a polywoven material bag, without puncturing or otherwise damaging the bag.

Bag placer devices are frequently used to prepare containers to be filled with other materials, such as solid, powder, or granular materials. Foods are often packaged in this way. The bag placer devices typically pull a container, such as a cardboard box or paper container, off of a stack, position it for filling, and separate two layers of material so as to open the container. The most typical means for placing and opening a container for filling is suction or vacuum technology. More particularly, suction devices create a seal between a gripping component and the material surface so as to enable the entire container to be lifted or for opposing surfaces to be moved away from one another to open the container for filling.

While the existing devices are generally effective when used with cardboard or paper containers because of the smooth and generally non-pourous characteristics of those materials, the use of traditional bag placing equipment with woven materials, such as polywoven bags, results in high failure rates. In other words, attempting to grip porous materials using suction technology results in unacceptable failure rates and, as a result, inefficient packaging.

Therefore, it would be desirable to have a gripper for use with woven materials that effectively grips the material such as to open polywoven material bags. Further, it would be desirable to have a gripper for opening bags without the use of suction or vacuum technologies. In addition, it would be desirable to have a material gripping device that does not damage the material that it grips.

SUMMARY OF THE INVENTION

A gripper according to the present invention includes a housing defining an open interior area and having a work surface. The work surface defines an opening to the interior area and the housing includes opposed first and second ends. The gripper includes a pair of outer stationary plates positioned in the interior area and being generally fixedly coupled to the housing, each plate having a plurality of generally linear first hooks extending away from the interior area past the work surface. The first hooks are angled generally parallel to one another and toward the housing first end. An inner plate is positioned in the interior area between the outer plates and includes a plurality of generally linear second hooks extending away from the interior area past the work surface. The second hooks are angled generally parallel to one another and opposite the first hooks, the inner plate being movable between a grip configuration and a release configuration. An actuator is in communication with the inner plate to selectively move the inner plate inside the interior area toward the second end to the grip configuration and toward the first end to the release configuration.

Therefore, a general object of this invention is to provide a gripper for gripping and then separating woven materials from one another.

Another object of this invention is to provide a gripper, as aforesaid, that grips polywoven bags without damaging the material.

Still another object of this invention is to provide a gripper, as aforesaid, that quickly and easily grips the material and quickly and easily release it.

Yet another object of this invention is to provide a gripper, as aforesaid, that may be used with a bag placer and filler apparatus.

A further object of this invention is to provide a gripper, as aforesaid, for gripping materials without the use of suction or vacuum technology.

A still further object of this invention is to provide a gripper, as aforesaid, in which gripping plates may be easily repaired or replaced.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

A gripper according to a preferred embodiment of the present invention will now be described in detail with reference to FIG. 1 through FIG. 11b of the accompanying drawings. More particularly, a gripper 100 includes a housing 110, a plurality of first hooks 125, and a plurality of second hooks 135.

Figure 1:
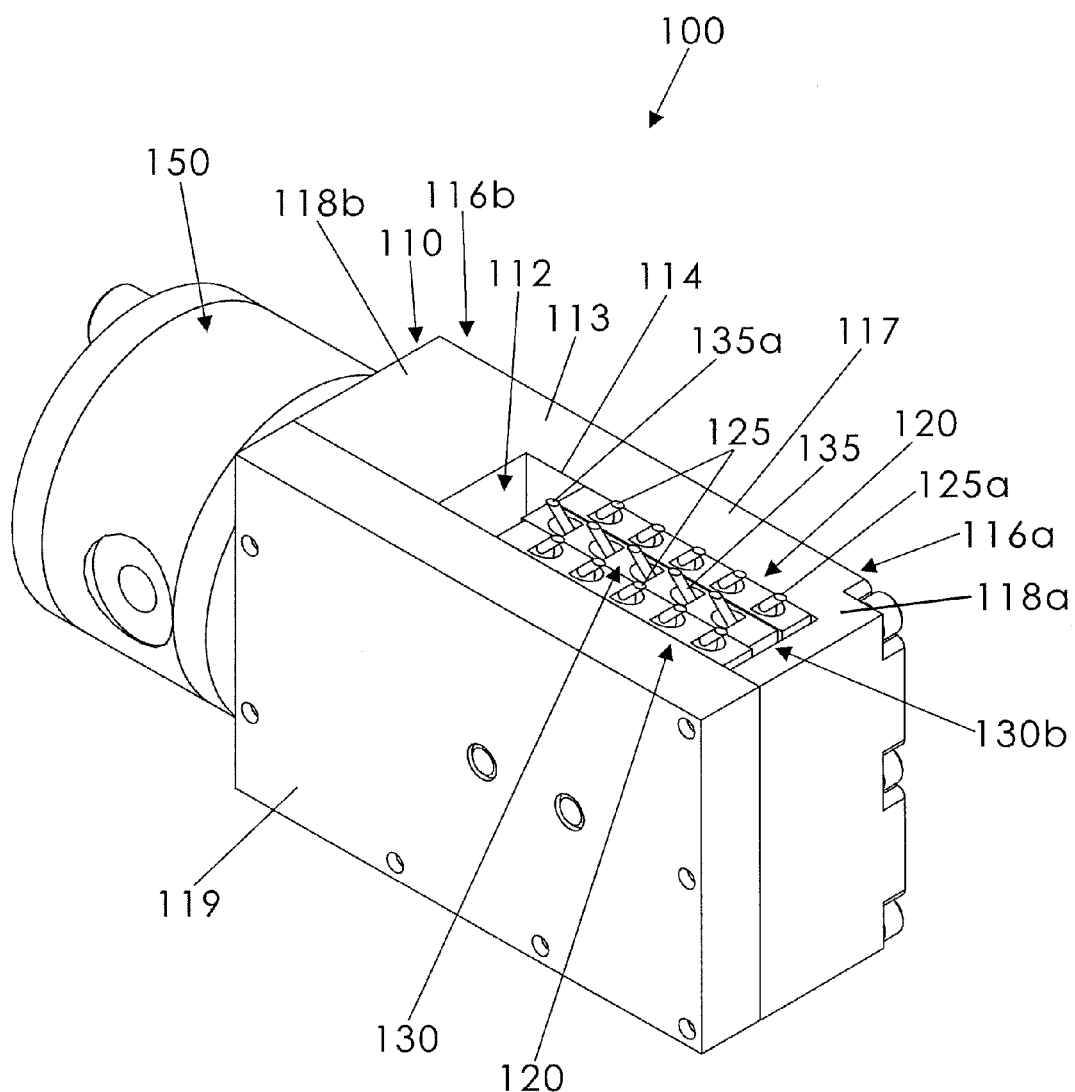
FIG. 1 is a perspective view of a gripper according to a preferred embodiment of the present invention.

As shown in FIG. 1, the housing 110 defines an open interior area 112 and has a generally planar work surface 113. The work surface 113 has an opening 114 to the interior area 112, and the housing 110 has opposed first and second ends 116a, 116b.

The first hooks 125 extend outwardly from the work surface 113 (i.e., away from the interior area past the work surface 113) toward the housing first end 116a, as shown in FIG. 1. The first hooks 125 may be generally linear and may be angled generally parallel to one another (FIG. 1). In some embodiments, as shown throughout the drawings, there are two rows of the first hooks 125.

Figure 6:
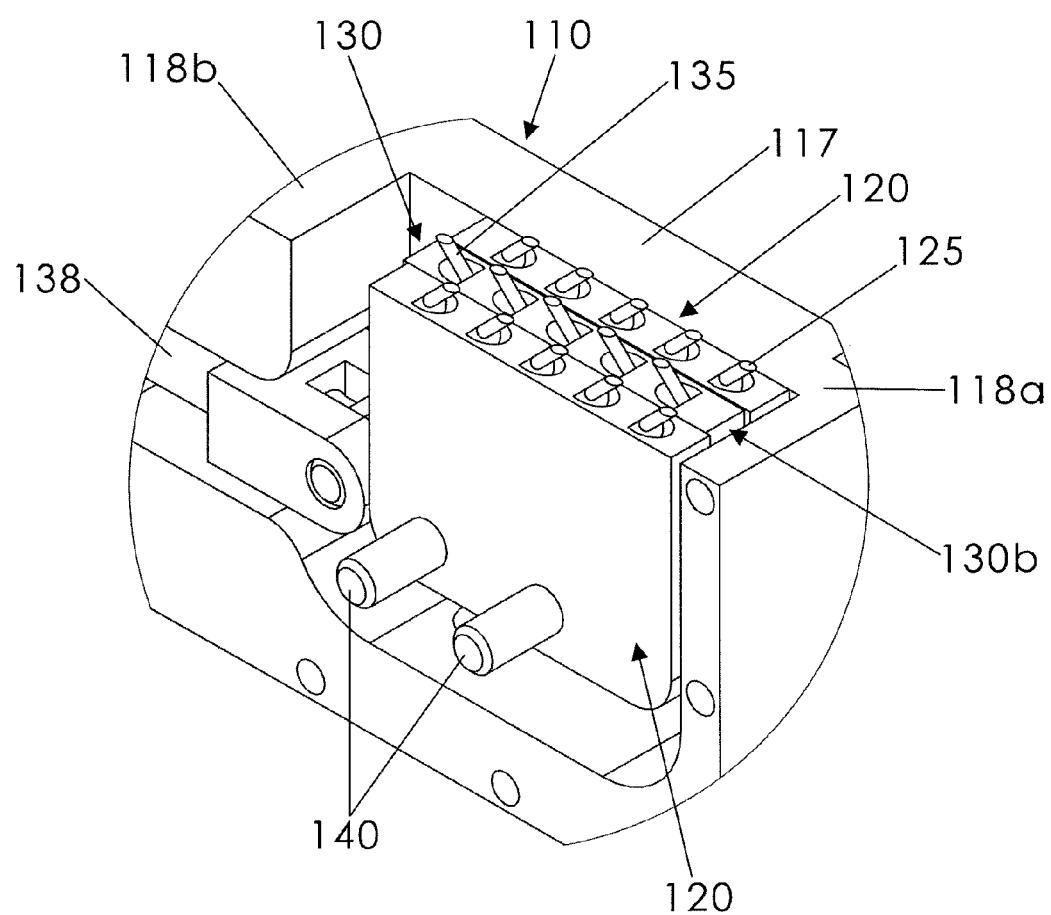
FIG. 6 is an isolated view on an enlarged scale taken from FIG. 5.
Figure 7:
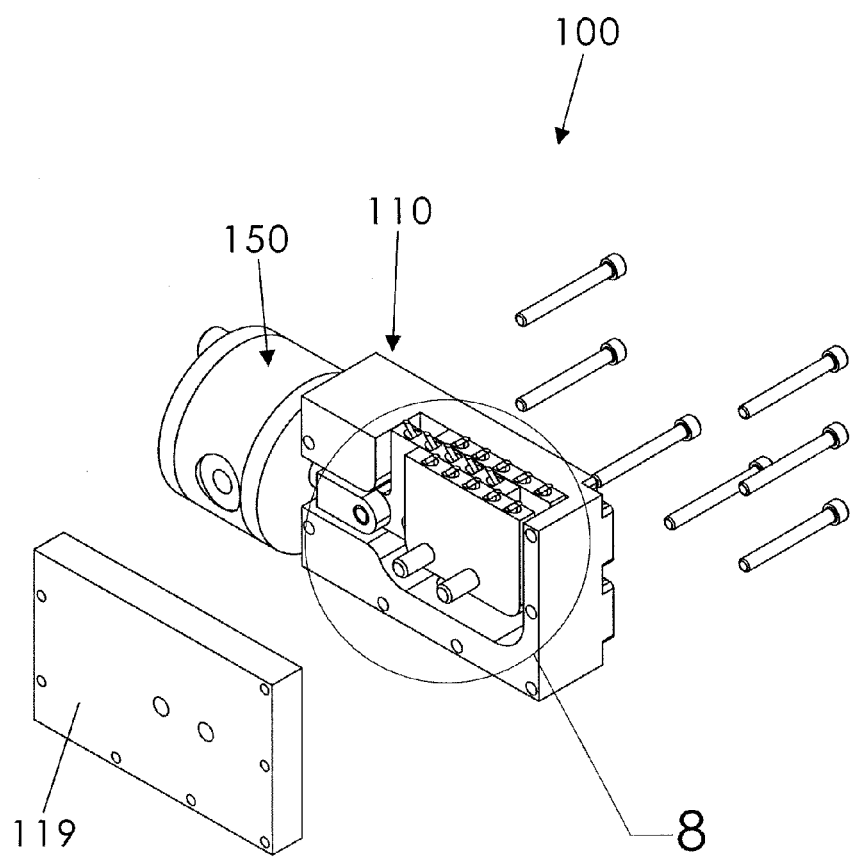
FIG. 7 is an exploded view of the gripper as in FIG. 1 with the plates in a grip configuration.

A pair of outer stationary plates 120 may be positioned in the interior area 112 and coupled to the housing 110 (FIGS. 1 and 6). The outer plates 120 may include the first hooks 125, and each outer plate 120 may have a row of the hooks 125. The outer plates 120 are coupled to the housing 110 such that the outer plates 120 remain fixed (i.e., do not move) when the gripper 100 is in use. For example, at least one pin 140 (FIG. 6) may couple the outer plates 120 to the housing 110.

Figure 3:
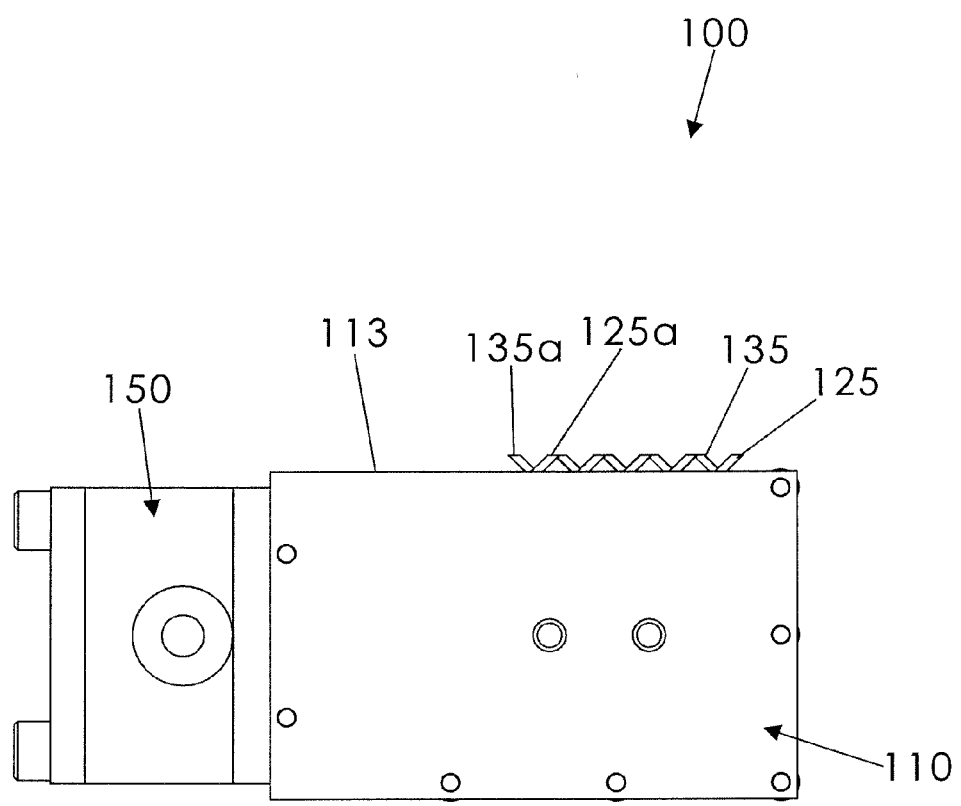
FIG. 3 is a front view of the gripper as in FIG. 1.
Figure 4:
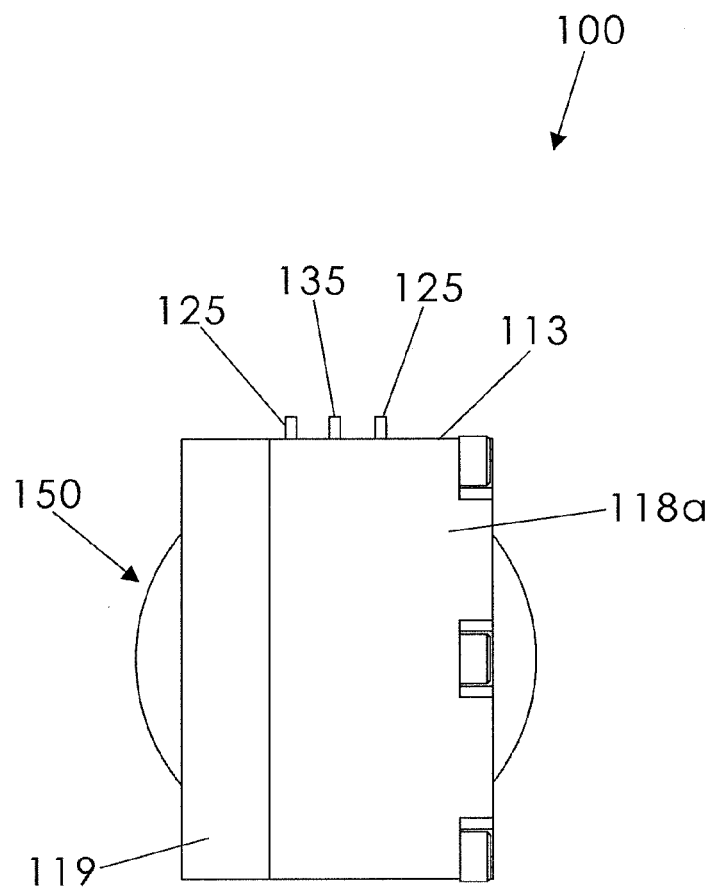
FIG. 4 is side view of the gripper as in FIG. 1.
Figure 5:
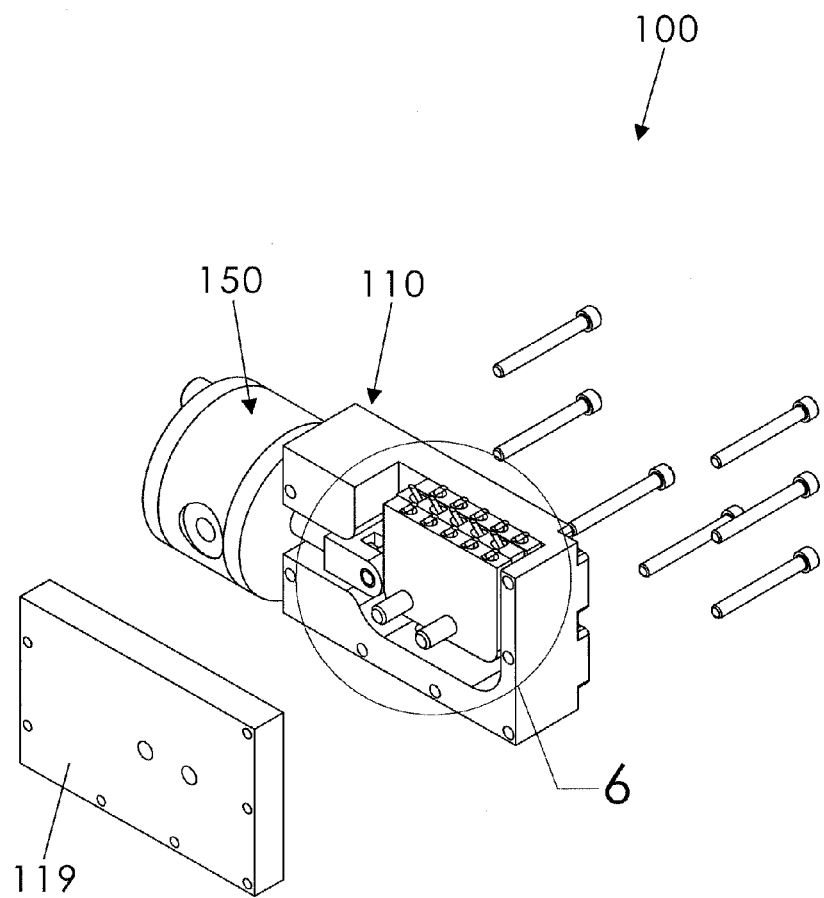
FIG. 5 is an exploded view of the gripper as in FIG. 1 with the plates in a release configuration.
Figure 8:
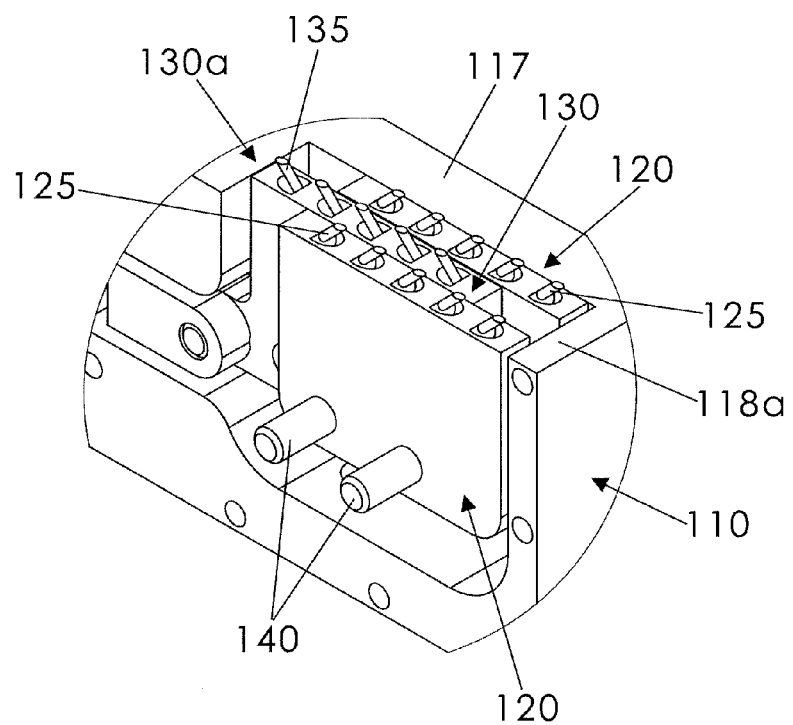
FIG. 8 is an isolated view on an enlarged scale taken from FIG. 7.

As shown in FIGS. 1, 6, and 8, an inner plate 130 is positioned in the interior area 112 between the first hooks 125 (e.g., between the outer plates 120), and the inner plate 130 has the second hooks 135. In some embodiments, there is one row of the second hooks 135. The second hooks 135 extend away from the interior area 112 past the work surface 113 and are angled generally parallel to one another and opposite the first hooks 125. In other words, the second hooks 135 extend toward the housing second end 116b. As shown in FIGS. 1 and 3, each first and second hook 125, 135 may have an end 125a, 135a that is generally coplanar with one another and that is generally parallel to the housing work surface 113.

The inner plate 130 is linearly movable between a grip configuration 130a relatively near the housing second end 116b (FIG. 8) and a release configuration 130b relatively near the housing first end 116a (FIG. 6), and an actuator 150 (FIG. 1) is in communication with the inner plate 130 (FIG. 8) to selectively move the inner plate 130 inside the interior area 112 toward the second end 116b to the grip configuration 130a (FIG. 8) and toward the first end 116a to the release configuration 130b (FIG. 6) using only linear motion. The actuator 150 may be, for example, a pneumatic cylinder, a hydraulic cylinder, an electrical solenoid, or a handle.

Figure 2:
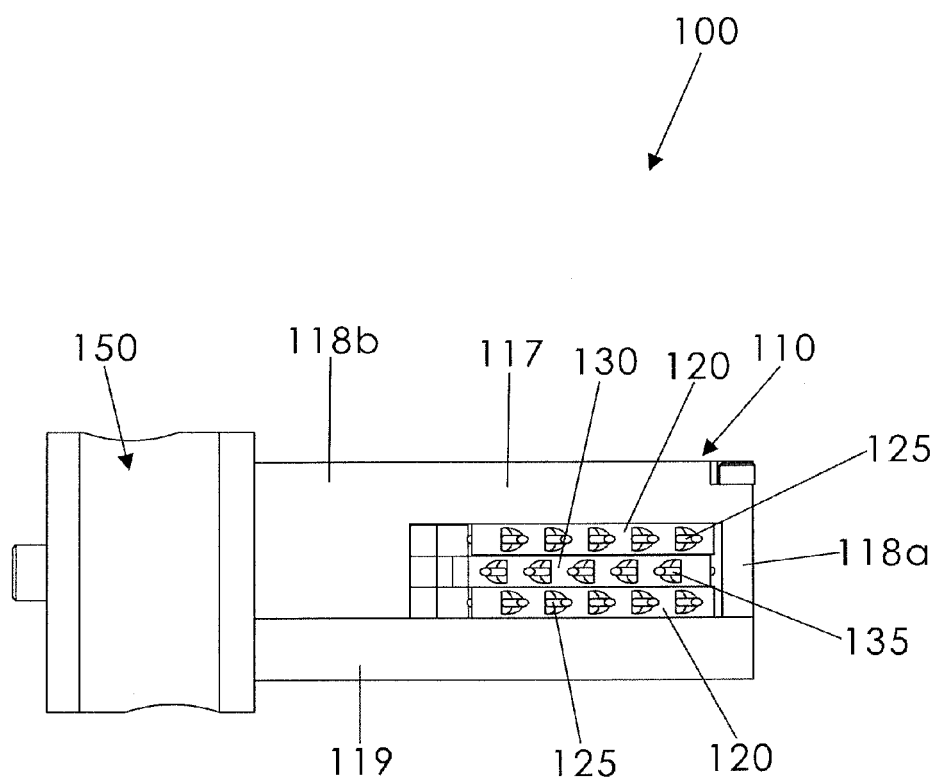
FIG. 2 is a top view of the gripper as in FIG. 1.

Returning to the housing 110, for manufacturing and/or repair purposes, the housing 110 may include at least two distinct portions. First, a sidewall 117 may be adjacent and extend along one outer plate 120, a first endwall 118a may be at the housing first end 116a and extend from the sidewall 117, and a second endwall 118b may be at the housing second 116b and extend from the sidewall 117 so that the outer plates 120 and the inner plate 130 are between the first and second endwalls 118a, 118b (FIG. 2). The second endwall 118b has an opening 138 (FIG. 6) to allow communication between the actuator 150 and the inner plate 130. Second, a cover 119 (FIGS. 1 and 2) may be adjacent the first and second endwalls 118a, 118b so that the outer plates 120 and the inner plate 130 are sandwiched between the sidewall 117 and the cover 119. In some embodiments, especially if maintenance is a concern, the cover 119 may be removably coupled to the first portion (e.g., by screws, etc.).

Figure 9A:
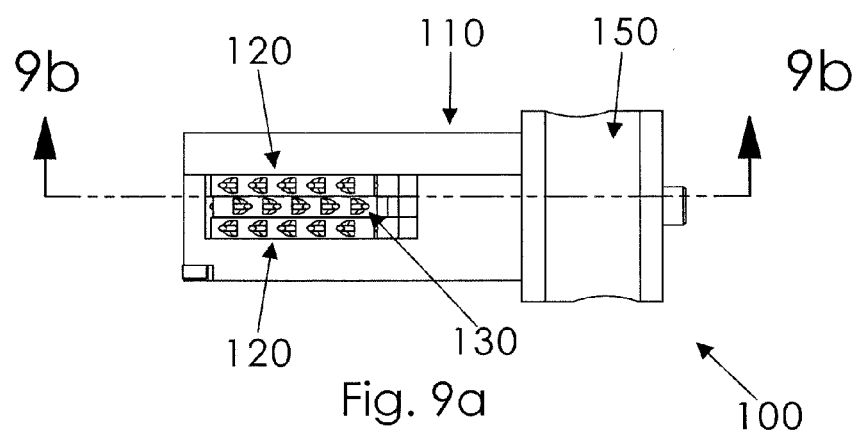
FIG. 9a is a top view of the gripper as in FIG. 1.
Figure 9B:
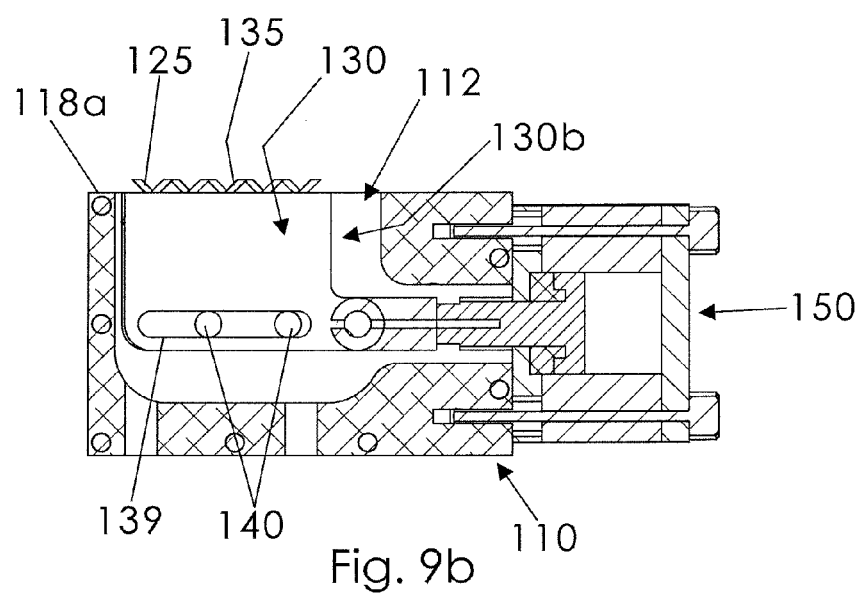
FIG. 9b is a sectional view taken along line 9b-9b of FIG. 9a shown in a release configuration.
Figure 10:
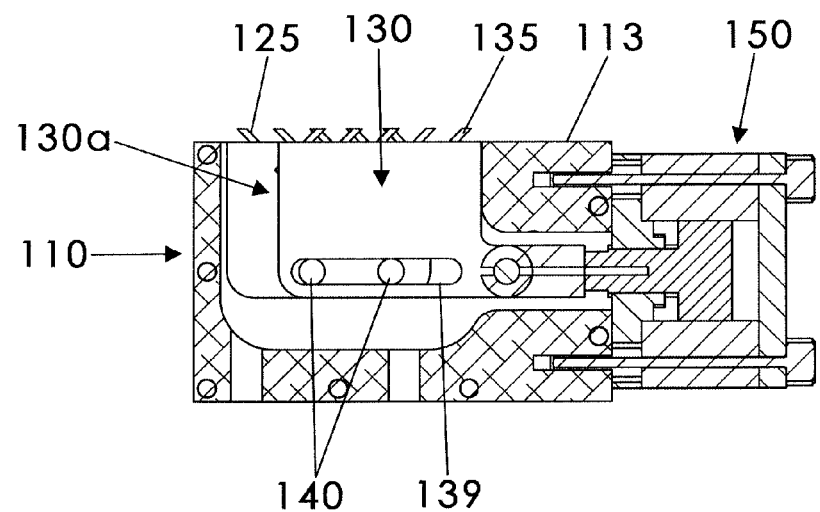
FIG. 10 is a sectional view as in FIG. 9b shown in a grip configuration.

The pin(s) 140 may extend from the sidewall 117 to the cover 119, through the outer plates 120 and the inner plate 130, to maintain the outer and inner plates 120, 130 in the interior area 112. As shown in FIGS. 9b and 10, the inner plate 130 may have a channel 139 adjacent the pin(s) 140 to allow the inner plate 130 to move linearly between the grip configuration 130a (FIG. 10) and the release configuration 130b (FIG. 9b). The pin(s) 140 may be removable when the cover 119 is separated from the first and second endwalls 118a, 118b to allow the outer and inner plates 120, 130 to be removed (e.g., to be serviced or replaced).

Figure 11A:
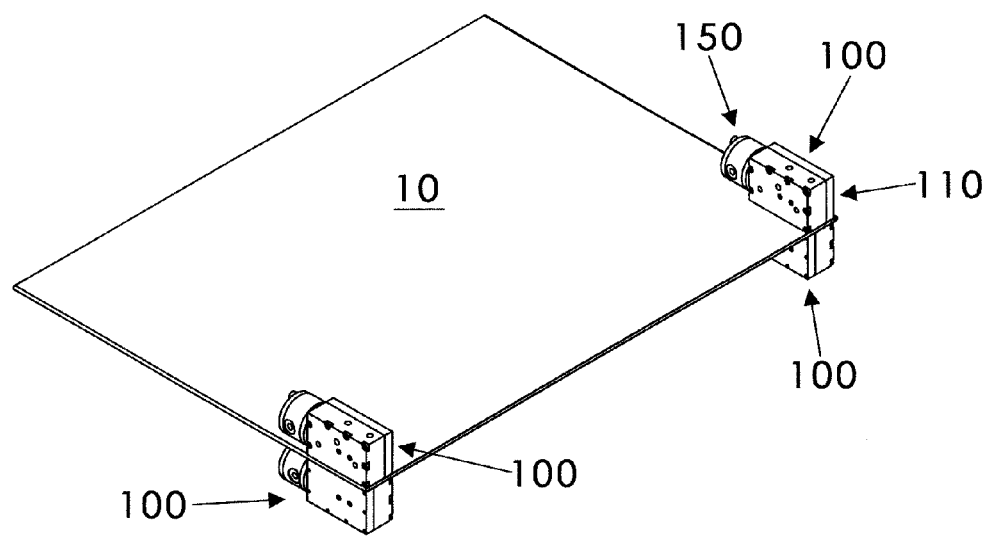
FIG. 11a is a perspective view of two pair of grippers in contact with two woven materials such as a closed bag.
Figure 11B:
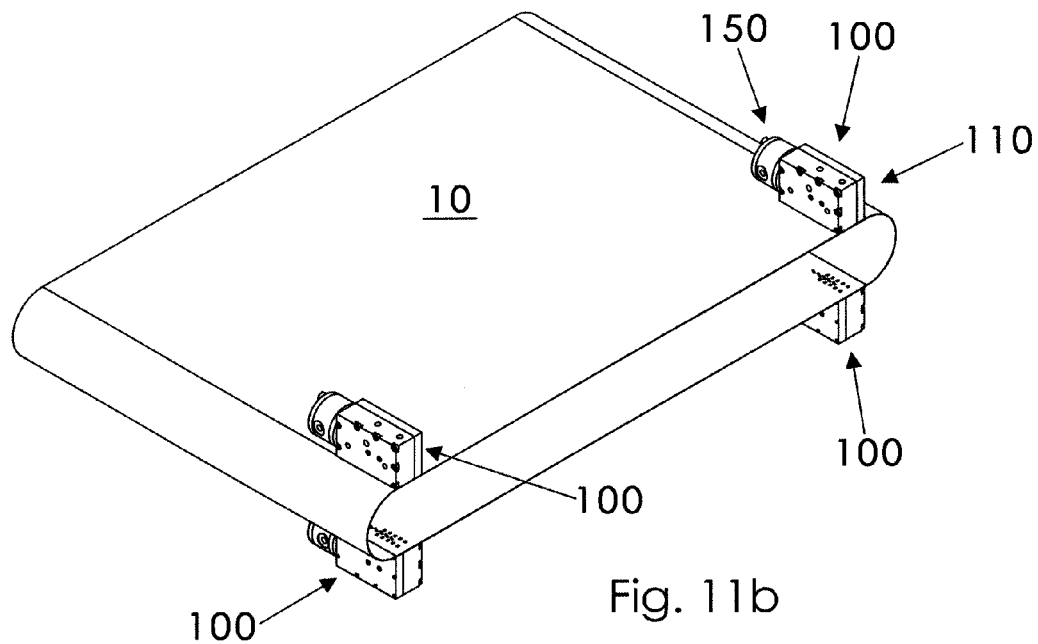
FIG. 11b is another perspective view as in FIG. 11a with one pair of grippers displaced from the other set of grippers so as to separate the two woven materials, such as to open a bag.

In use, the inner plate 130 may initially be at the release configuration 130b (FIGS. 1, 6, and 9b), and the work surface 113 may be placed adjacent, for example, a woven material. FIGS. 11a and 11b show four grippers 100 in use with a polywoven bag 10. After the work surface 113 of each gripper 100 is placed adjacent the bag 10, the actuator 150 of each gripper 100 moves the inner plate 130 of each gripper 100 to the grip configuration 130a (FIGS. 8 and 10), causing the first and second hooks 125, 135 to grip the bag 10 using only linear movement. The grippers 100 may then be separated from one another, causing the bag 10 to open, as shown in FIG. 11b. The actuator 150 of each gripper 100 may then allow or cause the inner plate 130 of each gripper 100 to return to the release configuration 130b to release the bag 10 from the grippers 100. While four grippers 100 are shown in use together in FIGS. 11a and 11b, it should be appreciated that any number of grippers 100 may be used in accordance with the principles set forth herein.

If the first and second hooks 125, 135 become dulled due to use, a sander (e.g., a belt sander) may be used to restore the generally coplanar configuration set forth above. It may be desirable, however, to actually replace the outer and inner plates 120, 130 to provide new first and second hooks 125, 135. In some embodiments, as set forth above, the cover 119 may be separated from the first and second endwalls 118a, 118b, the pin(s) 140 may be removed, and the outer and inner plates 120, 130 may be replaced. To replace the inner plate 130, it may be necessary to further operatively separate the inner plate 130 from the actuator 150. The pin(s) 140 and cover 119 may then be reassembled. Even if maintenance is not a concern and the cover 119 is not separable, the general configuration set forth herein may provide assembly and cost advantages over other gripping devices.

It is understood that while certain forms of this invention have been illustrated and described, it is not limited thereto except insofar as such limitations are included in the following claims and allowable functional equivalents thereof.

The invention claimed is:

1. A gripper, comprising:
    a housing defining an interior area having an open configuration and having a work surface, said work surface having an opening to said interior area, said housing having opposed first and second ends;
    a pair of outer stationary plates positioned in said interior area and being generally fixedly coupled to said housing, each of said outer stationary plates having a plurality of generally linear first hooks extending away from said interior area past said work surface, said first hooks being angled generally parallel to one another and toward said housing first end;
    an inner plate positioned in said interior area between said outer stationary plates and having a plurality of generally linear second hooks extending away from said interior area past said work surface, said second hooks being angled generally parallel to one another and opposite said first hooks, said inner plate being movable between a grip configuration and a release configuration;
    an actuator in communication with said inner plate to selectively move said inner plate inside said interior area toward said second end to said grip configuration and toward said first end to said release configuration;
    wherein said housing includes:
        a sidewall adjacent to one of said outer plates;
        a first endwall at said housing first end extending from said sidewall;
        a second endwall at said housing second end extending from said sidewall, said second endwall having an opening to allow communication between said actuator and said inner plate, said outer stationary plates and said inner plate being between said first and second endwalls; and
        a cover removably adjacent said first and second endwalls, said outer stationary plates and said inner plate being sandwiched between said sidewall and said cover when said cover is adjacent said first and second endwalls.

2. The gripper of claim 1, wherein:
    at least one pin extends from said sidewall to said cover through said outer stationary plates and said inner plate to maintain said outer stationary plates and said inner plate in said interior area; and said inner plate has a channel adjacent said at least one pin to allow said inner plate to move between said grip and release configurations.

3. The gripper of claim 2, wherein said at least one pin is removable when said cover is separated from said first and second endwalls to allow removal of said outer plates and said inner plate.

4. The gripper of claim 3, wherein each of said first and second hooks has an end coplanar with one another and generally parallel to said housing work surface when said outer plates and said inner plate are in said interior area.

5. The gripper of claim 4, wherein said actuator is selected from the group consisting of a pneumatic cylinder, a hydraulic cylinder, an electrical solenoid, and a handle.

6. The gripper of claim 5, wherein:
each of said outer stationary plates has a single row of said first hooks; and
said inner plate has a single row of said second hooks.

7. The gripper of claim 2, wherein each of said first and second hooks has an end coplanar with one another and generally parallel to said housing work surface when said outer plates and said inner plate are in said interior area.

8. The gripper of claim 1, wherein each of said first and second hooks has an end coplanar with one another and generally parallel to said housing work surface.

9. The gripper of claim 8, wherein:
each of said outer stationary plates has a single row of said first hooks; and
said inner plate has a single row of said second hooks.

10. A gripper using only linear motion, comprising:
a housing defining an interior area and having a generally planar work surface, said work surface having an opening to said interior area, said housing having opposed first and second ends;
a pair of outer stationary plates positioned in said interior area and being coupled to said housing, each of said outer stationary plates having a single row of first hooks extending away from said interior area past said work surface, said first hooks being angled toward said housing first end;
an inner plate positioned in said interior area between said outer stationary plates and having a row of second hooks extending away from said interior area past said work surface, said second hooks being angled opposite said first hooks, said inner plate being linearly movable between a grip configuration and a release configuration;
an actuator in communication with said inner plate to selectively move said inner plate inside said interior area toward said second end to said grip configuration and toward said first end to said release configuration using only linear motion:,
wherein said housing includes:
a sidewall adjacent to one of said outer plates;
a first endwall at said housing first end extending from said sidewall;
a second endwall at said housing second end extending from said sidewall, said second endwall having an opening to allow communication between said actuator and said inner plate, said outer stationary plates and said inner plate being between said first and second endwalls; and
a cover adjacent said first and second endwalls, said outer stationary plates and said inner plate being sandwiched between said sidewall and said cover.

11. The gripper of claim 10, wherein:
at least one pin extends from said sidewall to said cover through said outer stationary plates and said inner plate to maintain said outer stationary plates and said inner plate in said interior area; and
said inner plate has a channel adjacent said at least one pin to allow said inner plate to move linearly between said grip and release configurations.

12. The gripper of claim 11, wherein each of said first and second hooks has an end coplanar with one another and generally parallel to said housing work surface.

13. The gripper of claim 12, wherein said actuator is selected from the group consisting of a pneumatic cylinder, a hydraulic cylinder, an electrical solenoid, and a handle.

14. The gripper of claim 10, wherein each of said first and second hooks has an end coplanar with one another and generally parallel to said housing work surface.

15. A gripper, comprising:
a housing defining an interior area and having a work surface, said work surface having an opening to said interior area, said housing having opposed first and second ends;
a plurality of generally linear first hooks extending outwardly from said work surface, said first hooks being angled generally parallel to one another and toward said housing first end;
an inner plate positioned in said interior area between said first hooks and having a plurality of generally linear second hooks extending outwardly from said work surface, said second hooks being angled generally parallel to one another and opposite said first hooks, said inner plate being movable between a grip configuration and a release configuration;
an actuator in communication with said inner plate to selectively move said inner plate inside said interior area toward said second end to said grip configuration and toward said first end to said release configuration: and
wherein:
at least one pin extends through said inner plate to maintain said inner plate in said interior area; and
said inner plate has a channel adjacent said at least one pin to allow said inner plate to move linearly between said grip and release configurations.

16. The gripper of claim 15, wherein each of said first and second hooks has an end coplanar with one another and generally parallel to said housing work surface.

17. The gripper of claim 16, wherein said actuator is selected from the group consisting of a pneumatic cylinder, a hydraulic cylinder, an electrical solenoid, and a handle.

* * * * *